(12) United States Patent
Ether (10) Patent No.: US 7,129,658 B2
(45) Date of Patent: Oct. 31, 2006

(54) ELECTRO-MECHANICAL ACTUATOR BRAKING APPARATUS AND METHOD USING MOTOR COMMUTATION SENSOR OUTPUT TO DERIVE PISTON DISPLACEMENT

(75) Inventor: Russ Ether, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 107 days.

(21) Appl. No.: 10/879,982

(22) Filed: Jun. 29, 2004

(65) Prior Publication Data

US 2005/0082999 A1   Apr. 21, 2005

Related U.S. Application Data (60) Provisional application No. 60/511,108, filed on Oct. 15, 2003.

(51) Int. Cl.
*F16D 55/08* (2006.01)
*F16D 55/36* (2006.01)
*B60T 13/74* (2006.01)
*H02K 7/10* (2006.01)

(52) U.S. Cl. .................. 318/362; 318/370; 188/156; 188/71.5; 188/72.1; 303/20

(58) Field of Classification Search .......... 318/362, 318/368, 270, 364, 365; 188/156, 162, 72.1, 188/71.5; 303/20, 115.2
See application file for complete search history.

(56) References Cited

U.S. PATENT DOCUMENTS

| | | | |
|---|---|---|---|
| 4,596,316 A | 6/1986 | Crossman | |
| 4,995,483 A | 2/1991 | Moseley et al. | |
| 5,125,483 A * | 6/1992 | Kitagawa et al. | 188/158 |
| 5,189,355 A * | 2/1993 | Larkins et al. | 318/685 |
| 5,320,421 A | 6/1994 | Kade et al. | |
| 5,496,102 A * | 3/1996 | Dimatteo et al. | 303/162 |
| 5,823,288 A * | 10/1998 | Buff, IV | 180/445 |
| 5,971,110 A * | 10/1999 | Martin | 188/72.1 |
| 6,003,640 A | 12/1999 | Ralea | |
| 6,008,604 A * | 12/1999 | Maisch | 188/162 |
| 6,095,293 A | 8/2000 | Brundrett et al. | |
| 6,206,482 B1 * | 3/2001 | Campau et al. | 303/20 |
| 6,209,689 B1 * | 4/2001 | Bohm | 188/156 |
| 6,230,854 B1 | 5/2001 | Schwarz et al. | |
| 6,238,011 B1 | 5/2001 | Heckmann | |
| 6,279,694 B1 * | 8/2001 | Bohm et al. | 188/162 |
| 6,310,455 B1 | 10/2001 | Siraky et al. | |

(Continued)

FOREIGN PATENT DOCUMENTS

DE   19622545 A1   12/1997

(Continued)

*Primary Examiner*—Lincoln Donovan
*Assistant Examiner*—Eduardo Colon Santana
(74) *Attorney, Agent, or Firm*—Birch, Stewart, Kolasch & Birch, LLP (57) ABSTRACT

A braking system is disclosed that includes a brake (22), a ram (20) shiftable in a linear direction relative to the brake (22) for actuating the brake (22), and a stop (24) for limiting movement of the ram (20). The system further includes a motor (12) for moving the ram (20) which motor (12) includes a stator and a rotor (13) and a commutation sensor (14) producing an output. A motor controller (28) receives a commutation signal based on the output and controls the motor (12) based on the commutation signal. A processor (31) also uses the commutation signal to generate a position signal indicative of the position of the ram (20) relative to the stop (24). Methods of using this system are also disclosed.

21 Claims, 4 Drawing Sheets

U.S. PATENT DOCUMENTS

| | | |
|---|---|---|
| 6,397,977 B1 | 6/2002 | Ward |
| 6,422,659 B1 * | 7/2002 | Disser .................. 303/20 |
| 6,471,015 B1 | 10/2002 | Ralea et al. |
| 6,480,130 B1 | 11/2002 | Hanson et al. |
| 6,513,886 B1 * | 2/2003 | Weber et al. ............ 303/146 |
| 6,530,625 B1 | 3/2003 | Arnold et al. |
| 6,536,562 B1 | 3/2003 | Böhm et al. |
| 6,581,728 B1 | 6/2003 | Borugian |
| 6,702,069 B1 * | 3/2004 | Ralea et al. ............. 188/71.5 |
| 2005/0109565 A1 * | 5/2005 | Ralea et al. ............. 188/71.5 |

FOREIGN PATENT DOCUMENTS

| | | |
|---|---|---|
| EP | 1 279 854 A2 | 1/2003 |
| WO | WO-03/080415 A1 | 10/2003 |

* cited by examiner

ELECTRO-MECHANICAL ACTUATOR BRAKING APPARATUS AND METHOD USING MOTOR COMMUTATION SENSOR OUTPUT TO DERIVE PISTON DISPLACEMENT

CROSS-REFERENCE TO RELATED APPLICATIONS

This application claims the benefit of U.S. Provisional Patent Application No. 60/511,108 filed Oct. 15, 2003, the entire contents of which are hereby incorporated by reference.

FIELD OF THE INVENTION

This invention relates to braking systems utilizing electro-mechanical actuators, and more particularly, to a braking system and method using motor commutation sensor output to determine the position of an electro-mechanical actuator piston.

BACKGROUND OF THE INVENTION

Braking systems using electro-mechanical actuators (EMAs) have been considered as alternatives to conventional hydraulic braking arrangements. In one previously disclosed aircraft braking arrangement using EMAs, a plurality of EMAs are mounted on a brake carrier housing in an annular pattern about the axis of wheel rotation. The brake carrier housing is fixed to a torque tube having stator disks of a brake disk stack attached thereto. Rotor disks of the brake disk stack, which project between the stator disks attached to the torque tube so that rotor and stator disks alternate, are fixed to and rotatable with the wheel that rotates about an axis. The EMAs are selectively energized in response to a braking command, causing a motor-driven, reciprocating actuator piston ("ram") to extend and engage a pressure plate positioned on one end of the brake disk stack to compress the brake disk stack and retard wheel rotation. One EMA-based braking system is disclosed U.S. Pat. No. 6,530,625, titled "Electrically Actuated Brake with Vibration Damping," the entire contents of which are herein incorporated by reference.

Another EMA-based braking system is disclosed in U.S. Pat. No. 6,003,640, titled "Electronic Braking System with Brake Wear Measurement and Running Clearing Adjustment," the entire contents of which are herein incorporated by reference. This patent discloses an alternative to visual inspection of wear pin indicators to measure wear of the brake disk stack and set running clearance. In this patent, position sensors are used to determine actuator ram position and set running clearance values. The inventor of this application has found, however, that the use of a dedicated position sensor in an EMA arrangement has certain drawbacks, such as increased cost, weight, and size. Use of a separate element for position sensing also reduces the reliability of the system. An embodiment of the present invention addresses these drawbacks as well as other drawbacks of known EMA-based braking systems.

SUMMARY OF THE INVENTION

These drawbacks and others are addressed by the present invention which comprises, in a first aspect, an electro-mechanical actuator braking arrangement that derives piston displacement from motor commutation sensor values.

According to another aspect, an embodiment of the present invention is a method for controlling an electromechanical actuator braking arrangement by deriving piston displacement from motor commutation sensor values.

Another aspect of the invention comprises a braking system that includes a brake, a ram shiftable in a linear direction relative to the brake that includes an end face for engaging the brake and a stop surface. The system includes a motor having a stator and a rotor and a commutation sensor producing an output, the motor rotor being operably connected to the ram. A motor controller controls the motor based on the commutation sensor output. The system includes a first stop for limiting linear movement of the ram in a first direction away from the brake by engaging the ram stop surface, and a processor generates a position signal indicative of the position of the ram relative to the first stop based on the commutation sensor output.

In another aspect, the invention comprises a braking system including a brake disk stack, a ram shiftable in a linear direction relative to the stack that has a stop surface and an end face for engaging the stack, and a ballscrew/ballnut assembly operatively connected to the ram. The system further includes a motor having a stator and a rotor and a commutation sensor producing an output, the rotor being operably connected to the ballscrew/ballnut assembly, and a circuit producing from the output a commutation signal having zero crossings. A motor controller receives the commutation signal and produces a motor control signal for controlling the motor. A first stop is provided for limiting linear movement of the ram in a first direction away from the brake disk stack by contacting the ram stop surface. A processor is operatively connected to the commutation circuit and a memory, and the memory stores a first commutation signal value at a first time when the ram stop surface is contacting the first stop, a second commutation signal value at a second time, and a number of zero crossings between the first time and the second time. The processor determines from the first-commutation signal value, the second commutation signal value and the number of zero crossings the position of the ram relative to the first stop at the second time.

A further aspect of the invention comprises a method of controlling an electromechanical actuator controlled brake that involves providing a brake and an electromagnetic actuator, the electromagnetic actuator having a motor comprising a rotor, a stator, and a commutation sensor producing an output, and a ram having an end face and a first stop surface. A commutation signal is produced from the output and a value indicative of the displacement of the ram relative to a stop is derived from the commutation signal.

An additional aspect of the invention comprises a method of controlling an electric brake that involves providing a brake disk stack and an electromagnetic actuator having a motor comprising a rotor, a stator and a commutation sensor producing an output. An analog/digital converter operatively connected to the commutation sensor produces a commutation signal that varies from zero to a maximum value over a commutation sensor period and has zero crossings. A motor controller is provided that generates a control signal based on the commutation signal for controlling the motor. A processor is operatively connected to an accumulator storing a value and to a memory. The method further involves moving the ram until the first stop surface engages a stop, storing a first value of the commutation signal in the memory when the first stop surface engages the stop, zeroing the accumulator value, moving the end face toward and away from the brake disk stack by rotating the rotor, incrementing the accumulator value each time a zero crossing in a first direction is detected and decrementing the accumulator value each time a zero crossing in a second direction is detected. The position of the end face relative to the stop surface at a given time is determined by the following steps: determining a value k equal to a linear distance moved by the end face during a commutation sensor period, determining a present value of the commutation signal at the given time, subtracting the first value from the present value to obtain a difference, dividing the difference by the maximum value to obtain a quotient, adding the quotient to the accumulator value to obtain a sum, and multiplying the sum by the constant k.

Another aspect of the invention comprises a method of applying a force against a brake using the ram of an electromagnetic actuator that involves determining a predicted location of the ram based on a level of current supplied to the electromagnetic actuator, determining an actual location of the ram at a given time, determining a positional error between the predicted location and the actual location, and boosting the current supplied to the electromagnetic actuator based on the positional error.

Other aspects of embodiments of the present invention will become evident from the following description, with reference to the appended drawings.

DESCRIPTION OF THE INVENTION

Figure 1:
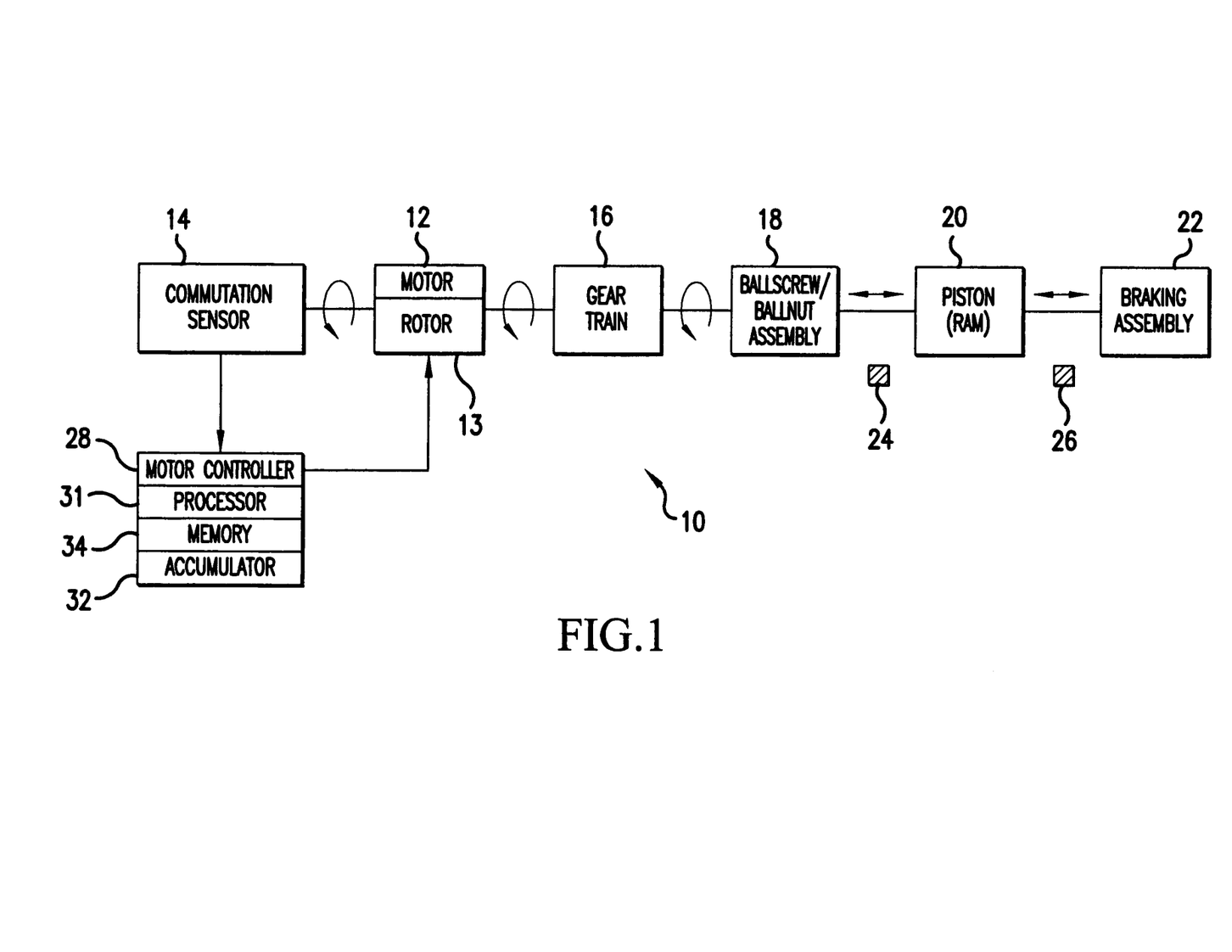
FIG. 1 is a block diagram of an EMA-based braking arrangement in accordance with an embodiment of present invention.

Referring now to the drawings, wherein the showings are for the purpose of illustrating preferred embodiments of the invention only and not for the purpose of limiting same, FIG. 1 illustrates an electromechanical actuator (EMA) braking arrangement 10 in accordance with an embodiment of the present invention. As shown in FIG. 1, the EMA braking arrangement 10 of this embodiment includes a brushless motor 12 having a rotor 13 and a commutation sensor 14; a reduction geartrain 16 connected to the motor 12 to amplify torque; a ballscrew/ballnut assembly 18 for translating rotary motion from the geartrain 16 to linear motion; a piston (sometimes referred to as a "ram") 20 connected to the ballscrew/ballnut assembly 18 to provide output force and motion; and a braking assembly 22 actuated by the force of ram 20 thereagainst. The EMA braking arrangement 10 of FIG. 1 further includes internal mechanical stops 24 ("retract stop") and 26 ("extend stop") and a motor controller 28 that includes computer processor 31. The motor controller 28 may also be referred to herein as an EMA electronic controller. Elements 12–26 may also be collectively referred to herein as "the EMA".

As described above, a known EMA-based braking arrangement includes a plurality of EMAs mounted on a brake carrier housing in a pattern about the axis of wheel rotation. The brake carrier housing is fixed to a torque tube having stator disks of a brake disk stack attached thereto. Rotor disks of the brake disk stack, which project between the stator disks attached to the torque tube so that rotor and stator disks alternate, are fixed to and rotatable with the wheel that rotates about an axis. The braking assembly 22 illustrated in FIG. 1 may be configured as such a brake disk stack. The EMA is selectively energized in response to a braking command, causing the ram 20 to extend and engage the brake disk stack so as to compress the brake disk stack and retard wheel rotation. Thus, a typical braking assembly will include a plurality (e.g., 2, 4, 5, etc.) of EMAs per wheel.

Figure 2:
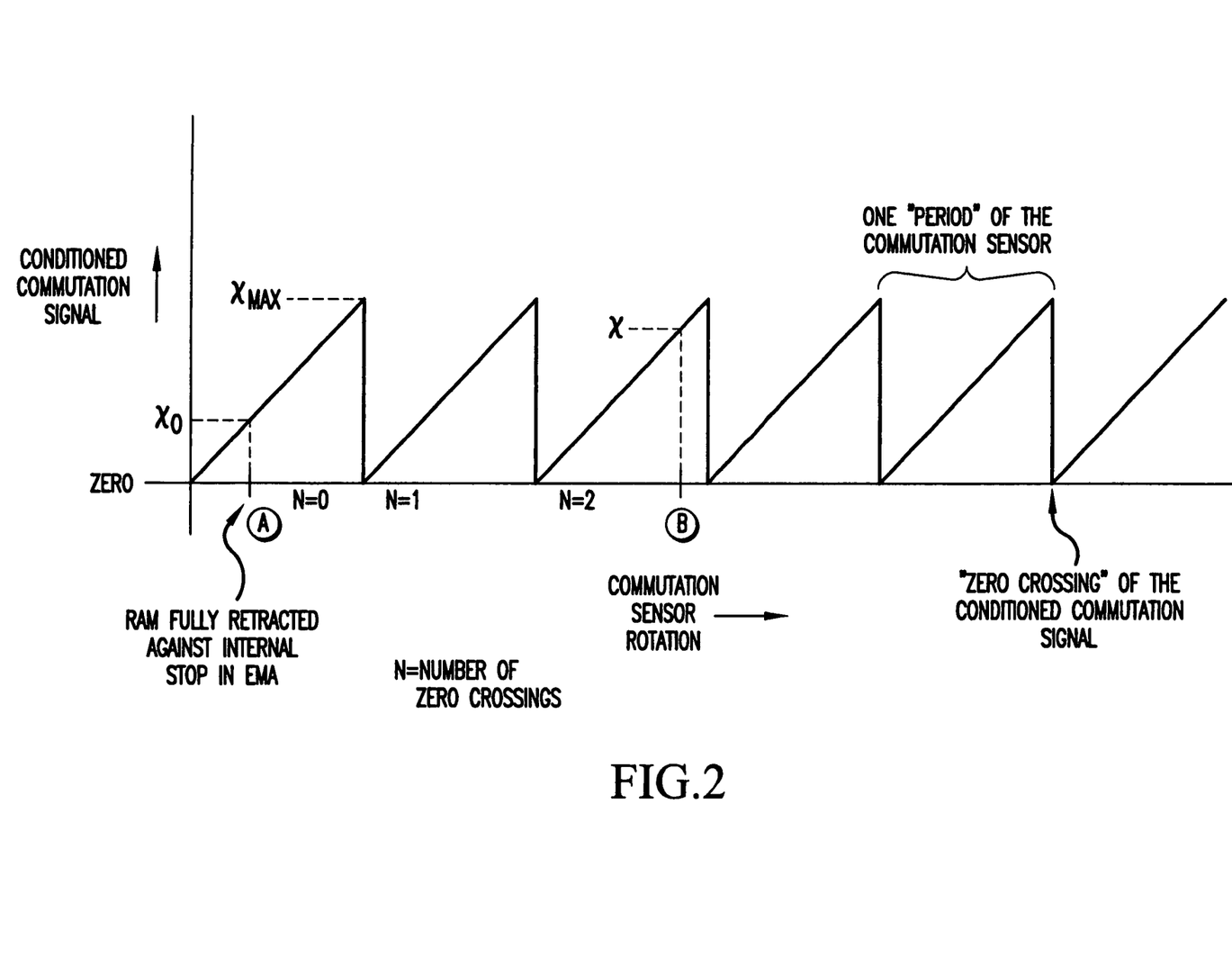
FIG. 2 schematically illustrates a commutation signal produced from the output of a commutation sensor according to an embodiment of the invention.

A commutation sensor in a brushless motor provides signals that are used by the motor control electronics (EMAC) to switch the currents in the motor windings to produce motor rotation ("commutation"). In the present embodiment, the commutation sensor is a resolver. The commutation sensor produces raw output waveforms that are fed through a resolver-to-digital converter to produce a useful commutation signal. An example of such an output signal is shown in FIG. 2. This commutation signal takes commutation signal values of 0 to a maximum value and then returns or wraps around to 0 after the maximum value is reached. Shifts between 0 and the maximum value are referred to herein as "zero crossings," even though it will be appreciated from FIG. 2 that the "crossing" is actually a change between maximum and minimum commutation signal values. A zero crossing may occur in a first or forward direction (left to right as viewed in FIG. 2) when the value of the signal changes from the maximum value to 0 or in a second or reverse direction (right to left as viewed in FIG. 2) when the value of the signal changes from 0 to the maximum value.

The signal from the commutation sensor 14 is not proportional to the output position of the EMA piston 20 over its full, range because the signal output by the commutation sensor 14 is periodic and has a period that may be a small fraction of the output range of the piston 20. The period of the output signal of the commutation sensor 14 is constrained by the requirement that it be suitable for its intended purpose (i.e., commutation), and cannot arbitrarily be extended to cover the output range of the piston 20. The motor controller 28 receives the commutation signal and uses it to control motor 12. In accordance with an embodiment of the present invention, a processor 31 produces a signal on a line 68 representing displacement of the piston 20 based on the output signal of the commutation sensor 14. Processor 31 is shown in FIG. 1 as comprising a part of motor controller 28; however, the processor 31 could also be a separate element without departing from the scope of the invention. Moreover, as used herein, the term "processor" is intended to include any element or circuit that receives and changes a signal and is not limited to a microprocessor, but could be, for example, an ASIC.

Figure 3:
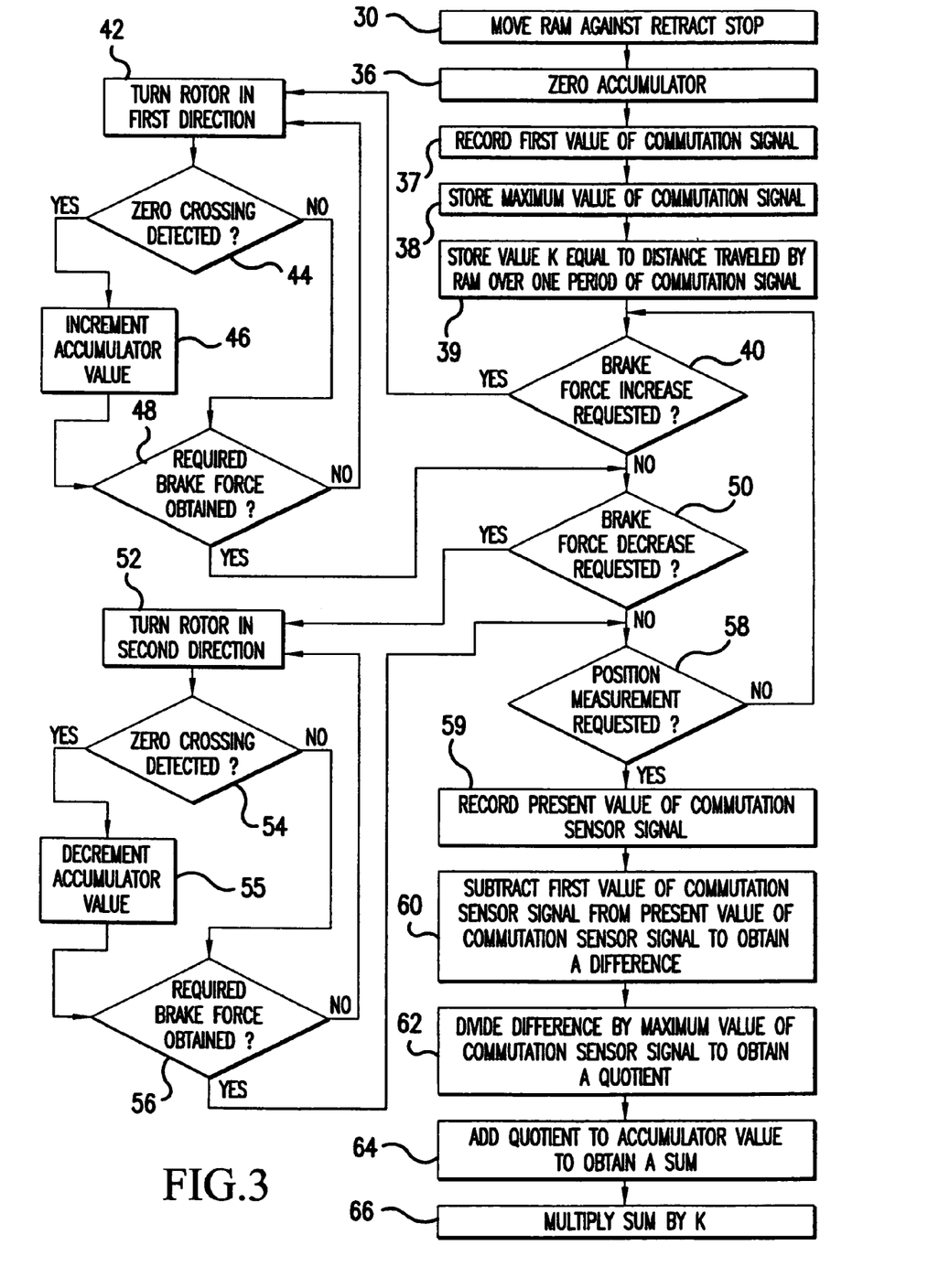
FIG. 3 is block flowchart illustrating operations performed by the brake controller using motor commutation sensor values to determine ram position in accordance with an embodiment of present invention.

Operation of an embodiment of the present invention will be described with reference to FIG. 3, which is flow chart illustrating a typical method of using the EMA-based braking arrangement 10 of FIG. 1 to determine the displacement of ram 20 relative to a known starting position. The position of retract stop 24 relative to the EMA's mounting interface with the braking assembly 22 is known and fixed and m ay be used as a reference position. The motor controller 28 receives a command from the vehicle, which may be an aircraft in accordance with an implementation of the present invention, to execute an Initiated Built In Test (IBIT). The vehicle issues this command only when it is safe to allow the braking system to perform its self-test: applying and releasing the brakes. This will occur while the wheels are chocked prior to starting the engines, and in flight when the landing gear is extended prior to landing.

During IBIT, the motor controller 28 commands the EMA to retract, at a controlled low speed, until it stalls against its retract stop 24 at a controlled force at a step 30. The motor controller 28 senses that the EMA has stalled (either by waiting a prescribed length of time or by observing that the commutation sensor signal has stopped changing), and then zeros an accumulator 32 in memory 34 at a step 36. A first value of the commutation signal when the ram is stalled against the retract stop is recorded at step 37, and this stored sensor reading is later used as an offset to address the fact that the commutation signal may not be zero when the EMA is stalled against retract stop 24. The maximum value of the commutation sensor output signal is stored at step 38 and a value k equal to the linear distance moved by the ram over one period of the commutation sensor is stored at step 39. Steps 38 and 39 are listed to indicate that the two values stored in these steps are available for use in later calculations. These values are generally preestablished for a given system, and therefore these steps may be performed one time when the system is initially programmed and not repeated thereafter.

At step 40, the motor controller 28 monitors an input (using either hardware or software or a combination thereof) to determine whether an increase in braking force is requested. If an increase is requested, motor controller 28 causes rotor 13 to turn in a first direction at step 42 and monitors for zero crossings in the commutation sensor output signal. If a zero crossing is detected, motor controller 28 increments the accumulator value at a step 46. If it is determined at step 48 that the requested brake force has not yet been obtained, the motor controller returns to step 42 and rotor 13 continues to turn. If no zero crossing is detected at step 44, a determination is made at step 48 as to whether the requested braking force has been achieved. If the necessary force has not been achieved, the controller returns to step 42 and rotor 13 continues to turn. This process continues until the desired brake force is attained.

Once the required brake force has been achieved, or alternately, if no increase in brake force was requested at step 40, the controller 28 determines at step 50 whether a decrease in braking force has been requested. If a decrease in braking force is required, rotor 13 is turned in a second direction opposite the first direction at step 52, and controller 28 monitors for zero crossings at step 54. Accumulator 32 is decremented at step 55 if a zero crossing is detected. After the accumulator is decremented, or if no zero crossing is detected, a determination is made at a step 56 as to whether the braking force has been reduced by the amount requested. If an additional decrease in braking force is needed, controller returns to step 52 and rotor 13 continues to turn in the second direction. This process repeats until the desired brake force is attained.

In the event that the requested brake force is achieved at step 48 or 56, or in the event that no change in braking force was requested at steps 40 or 50, a determination is made at step 58 as to whether a measurement of ram position is needed. If no measurement is required, the process returns to step 40 and a determination is made as to whether an increase in brake force is needed and the process continues as described above. Measurements of ram position are preferably made periodically, but may also be made on demand or upon the occurrence of certain events, such as at the beginning of a system test. A position measurement can be requested at any time, for example, while brake force is being adjusted. This allows the real-time position information to be used for various purposes including for the improvement of dynamic braking performance as discussed below.

If a ram position measurement is required at step 58, the present value of the commutation sensor signal is recorded at step 59. The first value of the commutation sensor signal recorded at step 37 is subtracted from the present value of the commutation sensor signal to obtain a difference at step 60. At step 62 the difference is divided by the maximum commutation sensor signal value from step 38 to obtain a quotient. The quotient is added to the accumulator value at step 64 to obtain a sum, and the sum is multiplied by the value k stored in step 39 to obtain the displacement of the ram at the time the position measurement is requested and output a signal representing this value on line 68. These steps may also be described by the formula:

$$\text{Displacement} = k \cdot [N + (X - X_0)/X_{MAX}]$$

where k is a constant representing ram travel for each complete electrical period of the commutation sensor, N is the accumulator value, X is the present value of the commutation signal, $X_0$ is the initial value of the commutation signal, and $X_{MAX}$ is the maximum value of the commutation signal. Values of X, $X_{MAX}$, and $X_0$ are illustrated in FIG. 2.

The zero-crossing detection may filtered so that sample errors and noise near the zero position do not erroneously increment or decrement the accumulator. Such filtering may be performed a variety of ways, for example based on known maximum rate at which the sensor 14 turns (defining expected timing of zero crossings). This known maximum rate also sets a limit on the maximum possible difference between successive readings of the sensor; differences greater than this limit can be rejected as false readings.

There does not necessarily need to be a one-to-one relationship between motor revolutions and sensor zero crossings for this embodiment of the invention to work. For each revolution of the motor rotor 13, the number of zero crossings is based on the arrangement of the sensor. If the sensor is mounted on the rotor shaft, there will be one or more zero crossings per revolution of the shaft. If the sensor is connected to the rotor shaft via a gear arrangement, the number of zero crossings could be more than, less than, or equal to one per shaft revolution. The sensor's output period is optimized to meet the needs of the sensor's commutation function and may be used as described in connection with the present invention without further adjustment.

The above-described steps provide the motor controller 28 with essentially real-time positional information concerning ram 20. From this information, the actual position of ram 20, and in particular end face 21 that engages braking assembly 22, can be determined. This information is used in connection with a number of system tests and in connection with system operation as described below.

In one embodiment of the invention, the position of ram 20 is used, in accordance with motion-control algorithms, to measure brake wear, set running clearance, boost the motor's dynamic performance, and improve built in tests performed by controller 28 such as the IBIT described above. A first value that is useful to obtain is the location of the ram 20 at "rotors tight," a position at which just enough force had been applied to braking assembly 22 to take the free play out of brake assembly 22. This value is obtained by extending ram 20 at a controlled low speed until it stalls at a controlled low force. This avoids undesirable high impact loads when the ram contacts the brake disk stack. The stall force of the ram 20 is proportional to the motor torque, which is proportional to the motor current, which is a controllable parameter.

The position of ram 20 when it stalls is recorded as the rotors tight position. This comprises a measure of brake wear because a given force will result in more ram travel to achieve rotors tight on a worn brake as compared to a new brake. This brake wear measurement is used to alert maintenance to service the brake. If the measurement returns a value too small to indicate a new brake or too large to indicate a fully worn brake, it represents a built-in test failure of the actuator.

The piston displacement value at the rotors tight position is updated each time the IBIT calibration sequence is executed. Thus, the reference rotors tight position changes as the brake wears. Because this value takes brake wear into consideration, it can be used as an accurate reference position from which to establish running clearance. "Running clearance" is a small displacement (typically 0.030" to 0.100" depending on the size of the braking system 22) of the ram 20 away from its rotors tight position, which prevents brake dragging.

Another step in the built-in test involves applying full force to the ram 20 until it stalls (as detected in a manner discussed above). Then the actual change in ram position is compared to the expected change. The spring rate of the braking assembly 22 is known, within some tolerance, and can be used to calculate the expected change in piston position that should result from a given change in piston force. If the difference is too small or too large, it represents a built-in-test failure of the actuator system, and the fault is reported and appropriate contingency management action is taken.

Another useful data point for use in monitoring the condition of braking system 22 is obtained by reducing the ram force to a predetermined level, such as 50%, for example, and comparing the measured position with the expected position at the predetermined level of ram force. This step comprises a further check of the proper operation of the braking system because too large an error indicates a problem with the system.

After the above tests are run, ram 20 is retracted a predetermined amount from the rotors tight position to establish running clearance. The ram position signal is used in a closed-loop control mode to hold running clearance at the desired position. Establishing running clearance is desirable because it affects the time required for the ram to engage the brake disk stack and begin compressing the brake disk stack. If running clearance were not established, it would require an unacceptably long time to actuate a worn brake. This completes the brake calibration process.

The measurement of the position of ram 20 can also be used in a process referred to herein as position-feedback transient torque boost. In accordance with one embodiment of the present invention, the real time position of ram 20 is used to boost the dynamic performance of the EMA. This allows the size and weight of the EMA to be reduced. This operation will be described with reference to FIG. 4.

During a steady state application of brake force, the force of the ram against the braking assembly 22 is determined by a torque command to the motor-control electronics. Motor torque is controlled by controlling the current supplied to motor 12. Thus, a given current produces a given torque which results in a determinable brake force at steady state. It is desirable to reduce hysteresis when using motor current to control ram force as explained, for example, in U.S. Pat. No. 6,480,130, issued Nov. 12, 2002, entitled Method for Improving Repeatability and Removing Hysteresis from Electromechanical Actuators, the contents of which are hereby incorporated by reference. This steady-state force is independent of variations in the brake's spring rate.

However, during dynamic braking operation, a signal indicative of ram position (signal 208 in FIG. 4) is used to create a transient position error signal 211 to boost the torque command 205. This additional transient torque effectively overcomes the motor rotor's inertia to rapidly accelerate it, resulting in substantially improved dynamic performance. This transient position error signal 211 is made transient by the addition of an integrator arrangement 216, which constantly reduces the transient error whenever the error is non-zero.

Figure 4:
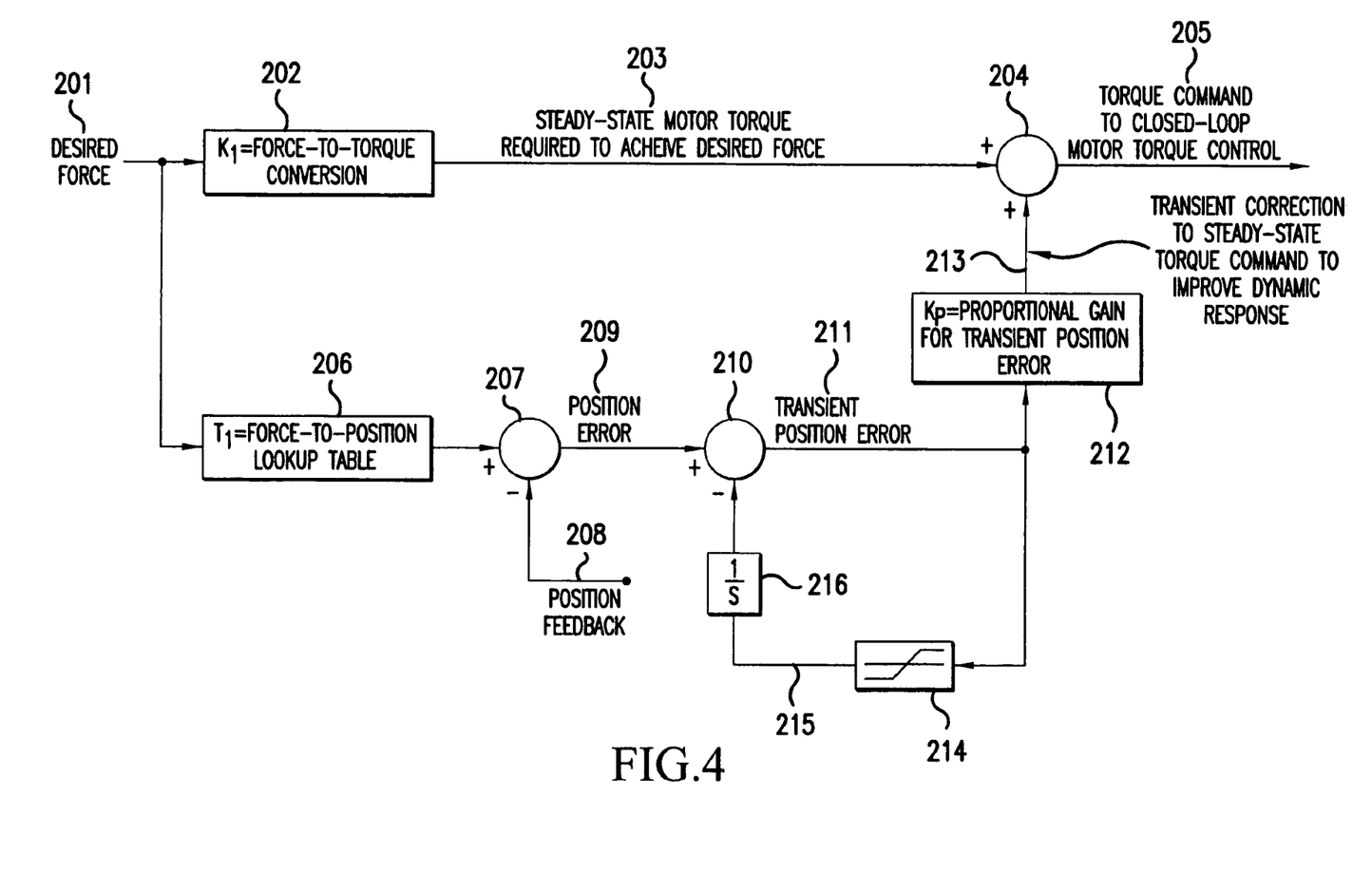
FIG. 4 is a functional block diagram illustrating an operation of transient torque boost using position-feedback in accordance with an embodiment of the present invention.

As shown in FIG. 4, the desired force 201 is converted to a steady-state motor torque 203 required to achieve the desired force. In the arrangement of FIG. 4, this conversion is performed by force-to-torque conversion block 202, which operates in accordance with a known conversion algorithm $K_1$. The output 203 of the force-to-torque conversion block 202 is corrected during transient operation (e.g., when a substantial change in braking force is desired) by a summing element 204, which receives the transient correction signal 213 from a block 212, which imparts proportional gain $K_p$ to the transient position error signal 211. The transient position error signal 211 is derived from a position error 209, calculated at 207 as the difference between an estimated position (calculated by converting the desired force 201 to a position value using force-to-position lookup table 206, T1) and the position feedback signal 208. The position error 209 is used to calculated the transient position error 211 by taking the difference of the position error 209 and the output of a feedback loop of the transient position error, the feedback loop including a limiter 214, which defines the rate of eliminating ("washing out") the position error, and the integrator arrangement 216.

This algorithm beneficially combines steady-state accuracy based on motor electrical current, and fast dynamic performance based on closed-loop position.

Another use of the information concerning the real time position of ram 20 is protecting the EMA from damage caused by full speed impact against stops 24, 26. As described above, the EMA has internal physical stops 24, 26 to prevent ram 20 from traveling beyond the limits of the ballscrew/ballnut assembly 18. Normally, these stops are designed to withstand the full impact of the ram 20 when traveling at maximum speed (inertial impact). However, this imposes a size and weight penalty. One implementation of the present invention uses the ram position and motion-control logic in the EMAC to detect when the piston is nearing the internal stops and automatically slow ram 20 before it reaches one of stops 24, 26.

It should be recognized that additional variations of the above-described implementations may be reached without departing from the spirit and scope of the present invention.

I claim:

1. A braking system comprising:
   a brake;
   a ram shiftable in a linear direction relative to said brake and having an end face for engaging said brake and a stop surface;
   a motor having a stator and a rotor and a commutation sensor producing an output, said rotor being operably connected to said ram;

a motor controller controlling said motor based on said output;

a first stop for limiting linear movement of said ram in a first direction away from said brake by engaging said ram stop surface; and a processor generating a position signal indicative of the position of said ram relative to said first stop based on said output.

2. The braking system of claim 1 wherein said processor comprises said motor controller.

3. The braking system of claim 1 wherein said brake comprises a brake disk stack.

4. The braking system of claim 1 wherein said commutation sensor comprises a resolver.

5. A braking system comprising:

a brake disk stack;

a ram shiftable in a linear direction relative to said stack and having a stop surface and an end face for engaging said stack;

a ballscrew/ballnut assembly operatively connected to said ram;

a motor having a stator and a rotor and a commutation sensor producing an output, said rotor operably connected to said ballscrew/ballnut assembly;

a circuit producing from said output a commutation signal having zero crossings;

a motor controller receiving said commutation signal and producing a motor control signal for controlling said motor;

a first stop for limiting linear movement of said ram in a first direction away from said disk stack by contacting said ram stop surface; and a processor operatively connected to said commutation circuit and a memory;

wherein said memory stores a first commutation signal value at a first time when said ram stop surface is contacting said first stop, a second commutation signal value at a second time, and a number of zero crossings between the first time and the second time, and said processor determines from the first commutation signal value, said second commutation signal value and said number of zero crossings the position of the ram relative to the first stop at the second time.

6. The braking system of claim 5 wherein said processor comprises said motor controller.

7. The braking system of claim 5 wherein said commutation sensor comprises a resolver.

8. A method of controlling an electromechanical actuator controlled brake comprising the steps of:

providing a brake;

providing an electromagnetic actuator having a motor comprising a rotor, a stator, and a commutation sensor producing an output; and a ram having an end face and a first stop surface;

providing a stop fixed with respect to said stator;

producing a commutation signal from the output; and deriving a value from the commutation signal indicative of the displacement of the ram relative to the stop.

9. The method of claim 8 wherein said step of providing a brake comprises the step of providing a brake disk stack.

10. The method of claim 8 including the additional step of storing a value of the commutation signal at an initial time when the first stop surface is contacting the stop.

11. The method of claim 10 wherein said step of monitoring a level of the commutation signal comprises the steps of incrementing a counter value each time a commutation signal zero crossing in a first direction is detected, and decrementing the counter value each time a commutation signal zero crossing in a second direction is detected.

12. The method of claim 11 wherein said commutation signal varies from 0 to a maximum value during a commutation sensor period, and including the additional step of storing a value k equal to a linear distance moved by the end face during a commutation sensor period.

13. The method of claim 12 including the additional steps of:

determining a present value of the commutation signal at a given time;

subtracting the initial value from the present value to obtain a difference;

dividing the difference by the maximum value to obtain a quotient;

adding the quotient to the counter value to obtain a sum; and multiplying the sum by the constant k.

14. The method of claim 8 wherein current is provided to the motor at a current level and including the additional steps of:

determining a desired brake force;

determining a required current level for generating the desired brake force;

monitoring the current level;

adjusting the current level to the required current level;

determining a predicted location for the ram based on the monitored current level;

determining a positional error between the predicted location for the ram end and the actual ram position based on the commutation signal; and boosting the current level based on the positional error.

15. The method of claim 14 including the additional steps of: producing an error signal proportional to the positional error and decreasing the boost to zero as the error signal approaches zero.

16. The method of claim 8 including the additional step of determining the displacement of the ram relative to the stop at a rotors tight position.

17. The method of claim 8 including the additional step of determining a running clearance based on the displacement of the ram relative to the stop.

18. The method of claim 8 including the additional steps of moving the ram toward the stop and slowing the movement of the ram when a distance between the ram and the stop approaches zero.

19. A method of controlling an electric brake comprising the steps of:

providing a brake disk stack;

providing an electromagnetic actuator having a motor comprising a rotor, a stator, a commutation sensor producing an output, an analog/digital converter operatively connected to the commutation sensor and producing a commutation signal varying from zero to a maximum value over a commutation sensor period and having zero crossings, a gear train connected to the rotor, a ballscrew/ballnut assembly operatively connected to the gear train and a ram driven by the ballscrew/ballnut assembly, the ram having an end face and a first stop surface;

providing a motor controller generating a control signal based on the commutation signal for controlling the motor;

providing a processor operatively connected to an accumulator storing a value and a memory;

providing a stop fixed with respect to the stator;

moving the ram until the first stop surface engages the stop;

storing a first value of the commutation signal in the memory when the first stop surface engages the stop;

zeroing the accumulator value;

moving the end face toward and away from the brake disk stack by rotating the rotor;

incrementing the accumulator value each time a zero crossing in a first direction is detected and decrementing the accumulator value each time a zero crossing in a second direction is detected; and determining the position of the end face relative to the first stop surface at a given time by:

determining a value k equal to a linear distance moved by the ram end during a commutation sensor period;

determining a present value of the commutation signal at the given time;

subtracting the first value from the present value to obtain a difference;

dividing the difference by the maximum value to obtain a quotient;

adding the quotient to the accumulator value to obtain a sum; and multiplying the sum by the constant k.

20. A method of applying a force against a brake using the ram of an electromagnetic actuator comprising the steps of:

determining a predicted location of the ram based on a level of current supplied to the electromagnetic actuator;

determining an actual location of the ram at a given time;

determining a positional error between the predicted location and the actual location; and boosting the current supplied to the electromagnetic actuator based on the positional error.

21. The method of claim 20 wherein said step of boosting the current comprises the step of providing a transient boost to the current.

* * * * *